US010926256B2

(12) United States Patent
Parry-Jones et al.

(10) Patent No.: US 10,926,256 B2
(45) Date of Patent: *Feb. 23, 2021

(54) HOUSING FOR SIMPLE ASSEMBLY OF AN EWOD DEVICE

(71) Applicant: Sharp Life Science (EU) Limited, Oxford (GB)

(72) Inventors: Lesley Anne Parry-Jones, Oxford (GB); Emma Jayne Walton, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 286 days.

This patent is subject to a terminal disclaimer.

(21) Appl. No.: 15/902,276

(22) Filed: Feb. 22, 2018

(65) Prior Publication Data

US 2019/0015831 A1 Jan. 17, 2019

Related U.S. Application Data

(63) Continuation-in-part of application No. 15/647,562, filed on Jul. 12, 2017.

(51) Int. Cl.
*B01L 3/00* (2006.01)
*G01N 27/447* (2006.01)

(52) U.S. Cl.
CPC ..... *B01L 3/502715* (2013.01); *B01L 3/50273* (2013.01); *B01L 3/502707* (2013.01);
(Continued)

(58) Field of Classification Search
CPC ......... G01N 27/44791; B01L 3/502715; B01L 3/502707; B01L 3/50273; B01L 3/502792
See application file for complete search history.

(56) References Cited

U.S. PATENT DOCUMENTS 6,565,727 B1 5/2003 Shenderov
6,911,132 B2 6/2005 Pamula et al.
(Continued)

FOREIGN PATENT DOCUMENTS

CN 104570326 4/2015
EP 1662276 5/2006
(Continued)

OTHER PUBLICATIONS

Kim, Hanyoup, et al. "Automated digital microfluidic sample preparation for next-generation DNA sequencing." JALA: Journal of the Association for Laboratory Automation 16.6 (2011): 405-414.*
(Continued)

*Primary Examiner* — Robert J Eom
(74) *Attorney, Agent, or Firm* — Renner, Otto, Boisselle & Sklar, LLP

(57) ABSTRACT

An EWOD device includes a first substrate assembly and a second substrate assembly; wherein one of said substrate assemblies includes electrowetting electrodes, and the first substrate assembly and the second substrate assembly are spaced apart to define a channel between the substrate assemblies; and a housing for receiving the first substrate assembly and the second substrate assembly, the housing comprising an alignment feature for locating at least one of the first and second substrate assemblies within the housing. The device further includes a fixing feature for fixing the first and second substrate assemblies within the housing. The second substrate assembly is located within the housing such that the second substrate assembly is an outer component of the EWOD device. The device further may include a spacer that spaces apart the first substrate assembly from the second substrate assembly to define the channel between the first and second substrate assemblies.

20 Claims, 13 Drawing Sheets

(52) U.S. Cl.
CPC .. B01L 3/502792 (2013.01); G01N 27/44791 (2013.01); B01L 2200/025 (2013.01); B01L 2200/027 (2013.01); B01L 2200/0689 (2013.01); B01L 2300/0645 (2013.01); B01L 2300/0816 (2013.01); B01L 2300/0851 (2013.01); B01L 2300/0858 (2013.01); B01L 2300/161 (2013.01); B01L 2400/0427 (2013.01)

(56) References Cited

U.S. PATENT DOCUMENTS

| 7,163,612 | B2 | 1/2007 | Sterling et al. |
| 9,011,662 | B2 | 4/2015 | Wang et al. |
| 9,465,206 | B1 * | 10/2016 | Thijssen et al. |
| 2008/0278895 | A1 | 11/2008 | Woo |
| 2010/0247086 | A1 | 9/2010 | Tallaron et al. |
| 2012/0026596 | A1 | 2/2012 | Berge et al. |
| 2013/0120827 | A1 | 5/2013 | Takai et al. |
| 2013/0134039 | A1 | 5/2013 | Bjornson et al. |
| 2013/0206597 | A1 | 8/2013 | Wang et al. |

FOREIGN PATENT DOCUMENTS

| JP | 2007536592 | 12/2007 |
| JP | 2008152263 | 7/2008 |
| JP | 2012168407 | 9/2012 |
| JP | 2013104913 | 5/2013 |
| JP | 201485571 | 5/2014 |
| JP | 2015502575 | 1/2015 |
| WO | 2013/081846 | 6/2013 |
| WO | 2016119581 | 8/2016 |

OTHER PUBLICATIONS

Cho, Sung Kwon, et al. "Towards digital microfluidic circuits: creating, transporting, cutting and merging liquid droplets by electrowetting-based actuation." Technical Digest. MEMS 2002 IEEE International Conference. Fifteenth IEEE International Conference on Micro Electro Mechanical Systems (Cat. No. 02CH37266).*

Zhao, Yuejun, and Sung Kwon Cho. "Micro air bubble manipulation by electrowetting on dielectric (EWOD): transporting, splitting, merging and eliminating of bubbles." Lab on a Chip 7.2 (2007): 273-280.*

Definition: "Space" (verb); Merriam-Webster; https://www.merriam-webster.com/dictionary/space#:~:text=verb,cheese%20on%20the%20baking%20sheet%E2%80%A6%20%E2%80%94; Accessed Online Jul. 13, 2020; p. 1-10.*

Digital microfluidics: is a true lab-on-a-chip possible?, R.B. Fair, Microfluid Nanofluid (2007) 3:245-281).

Claims from Parent Case, U.S. Appl. No. 15/647,562.

Extended European Search Report of EP Application No. 18182737 dated Sep. 14, 2018.

Creating, Transporting, Cutting, and Merging Liquid Droplets; Sung Kwon Cho et al., Journal of Microelectromechanical Systems, vol. 12, No. 1, Feb. 2003.

Automated Digital Microfluidic Sample Preparation for Next-Generation DNA Sequencing, Hanyoup Kim et al.; Dec. 2011.

* cited by examiner

Fig. 1: PRIOR ART

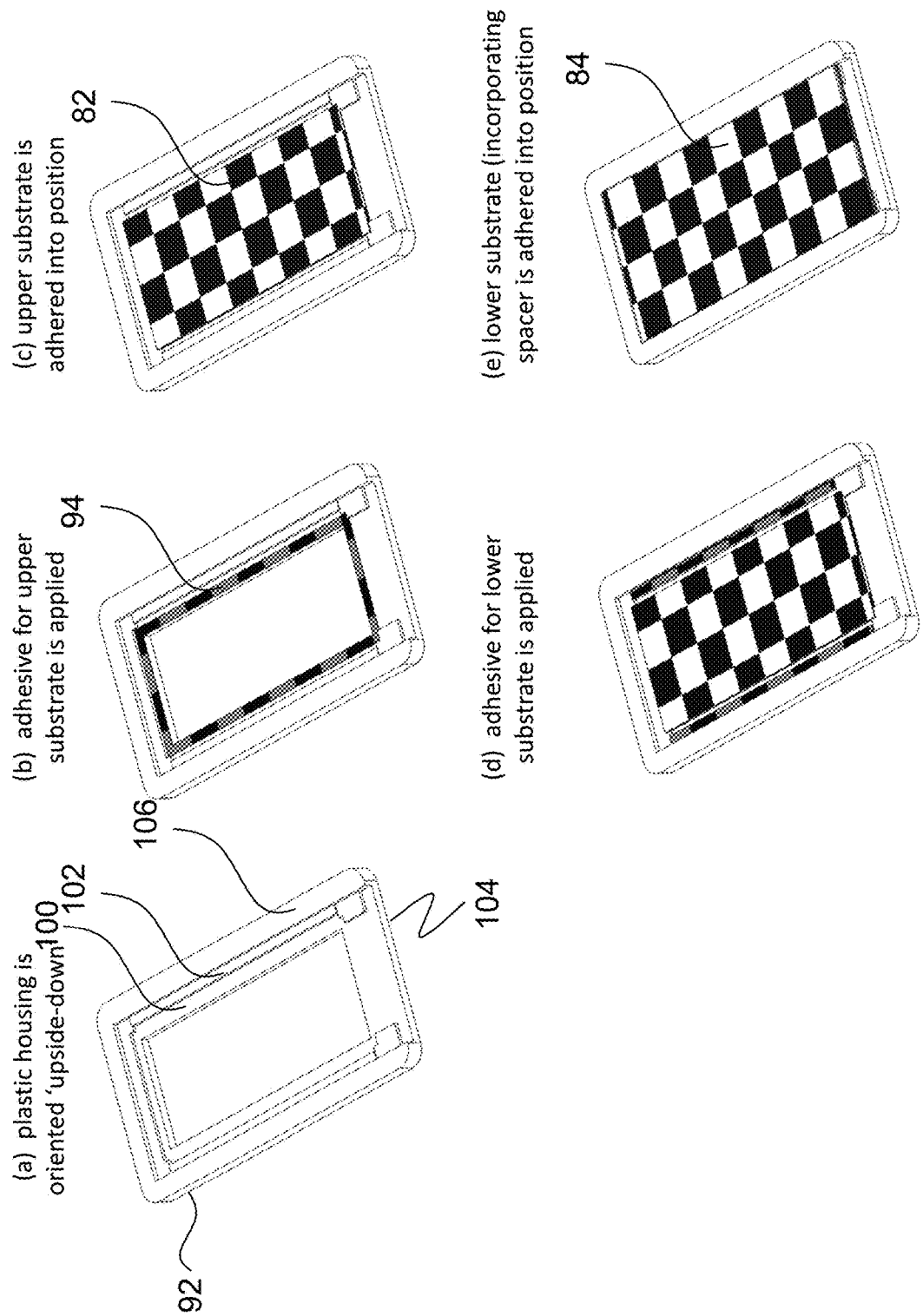

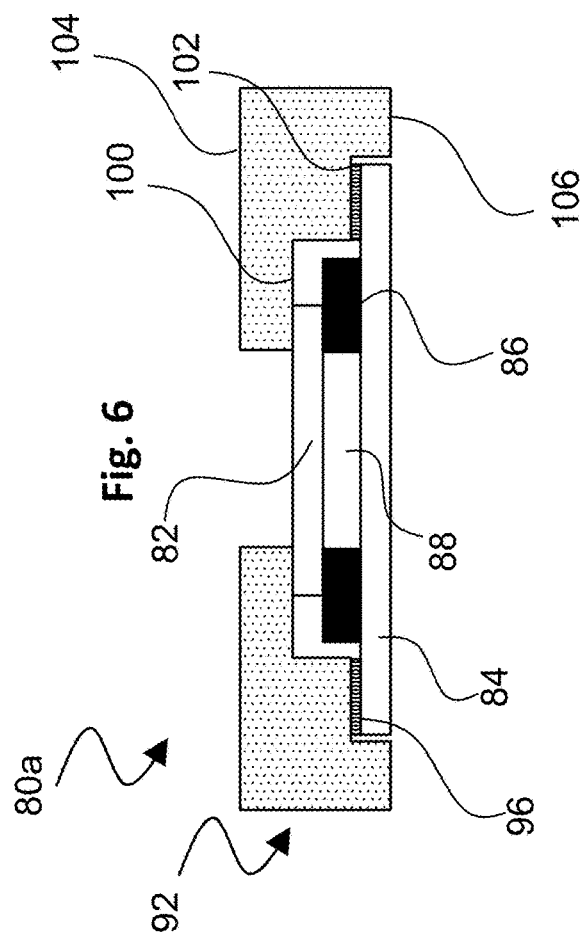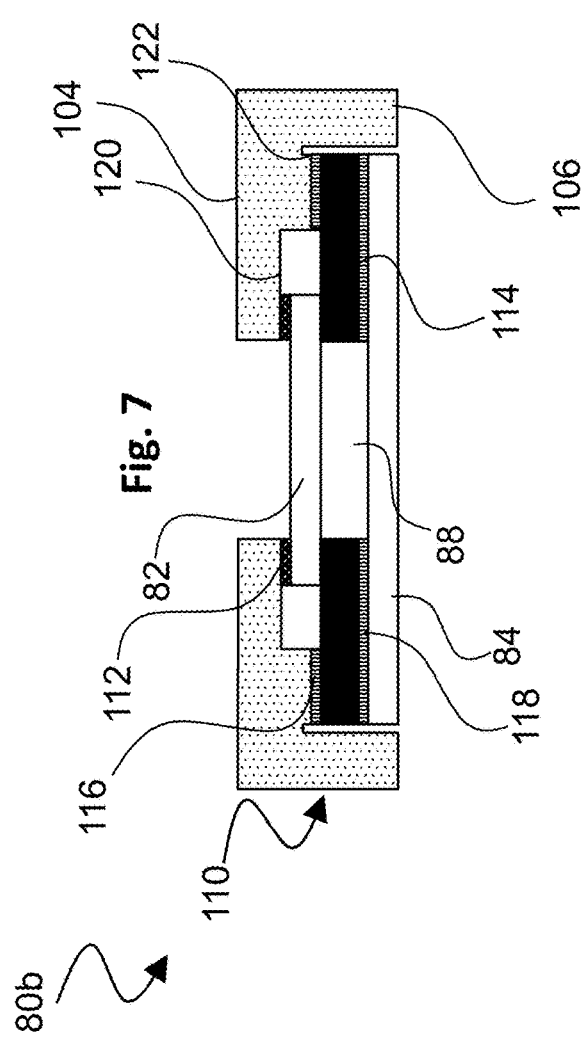

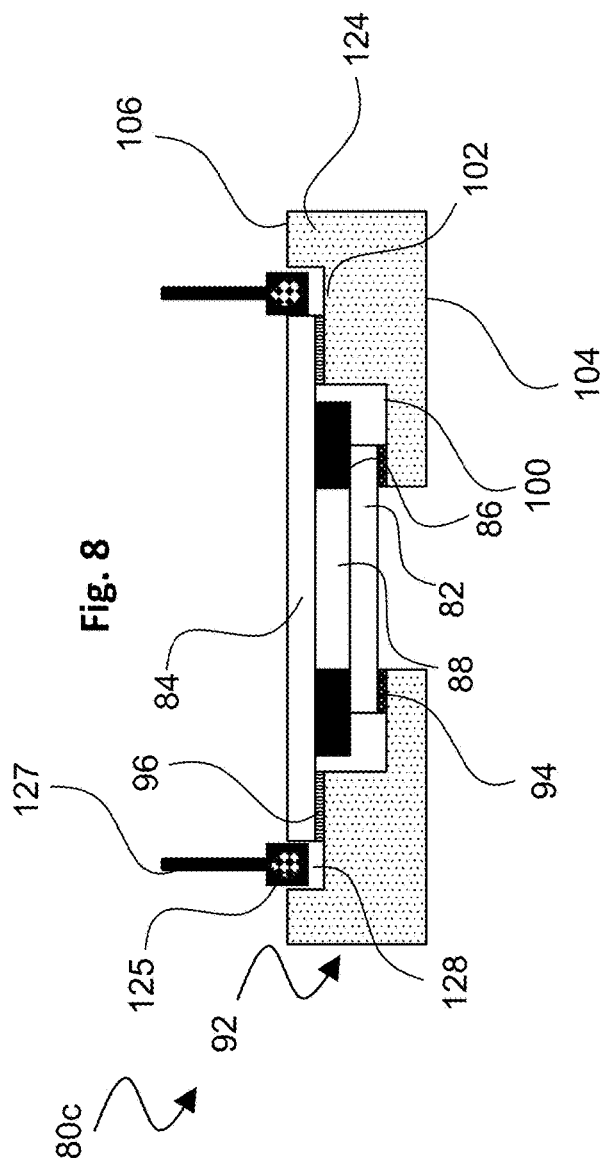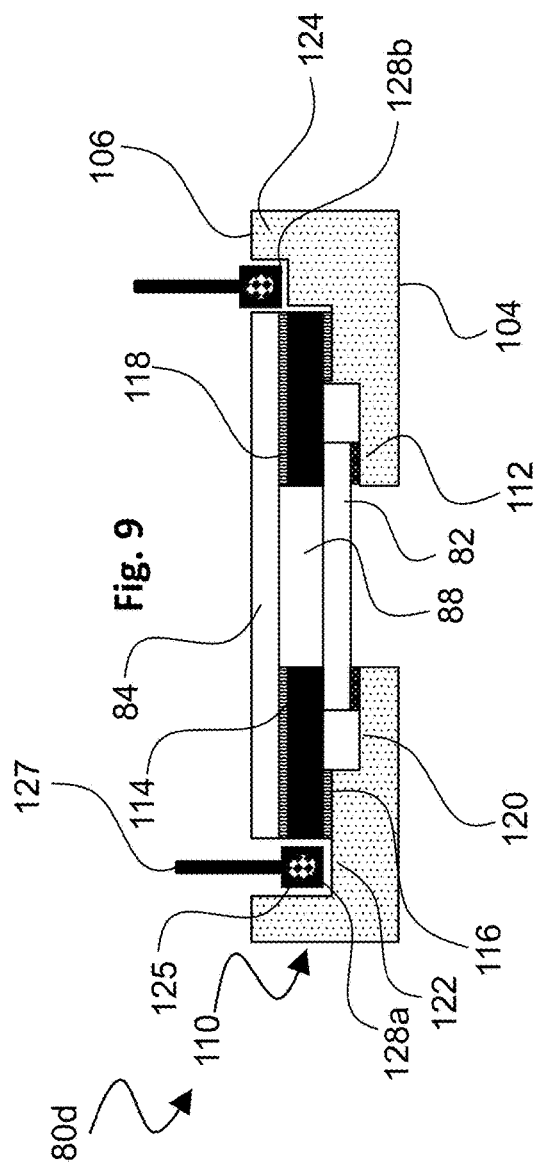

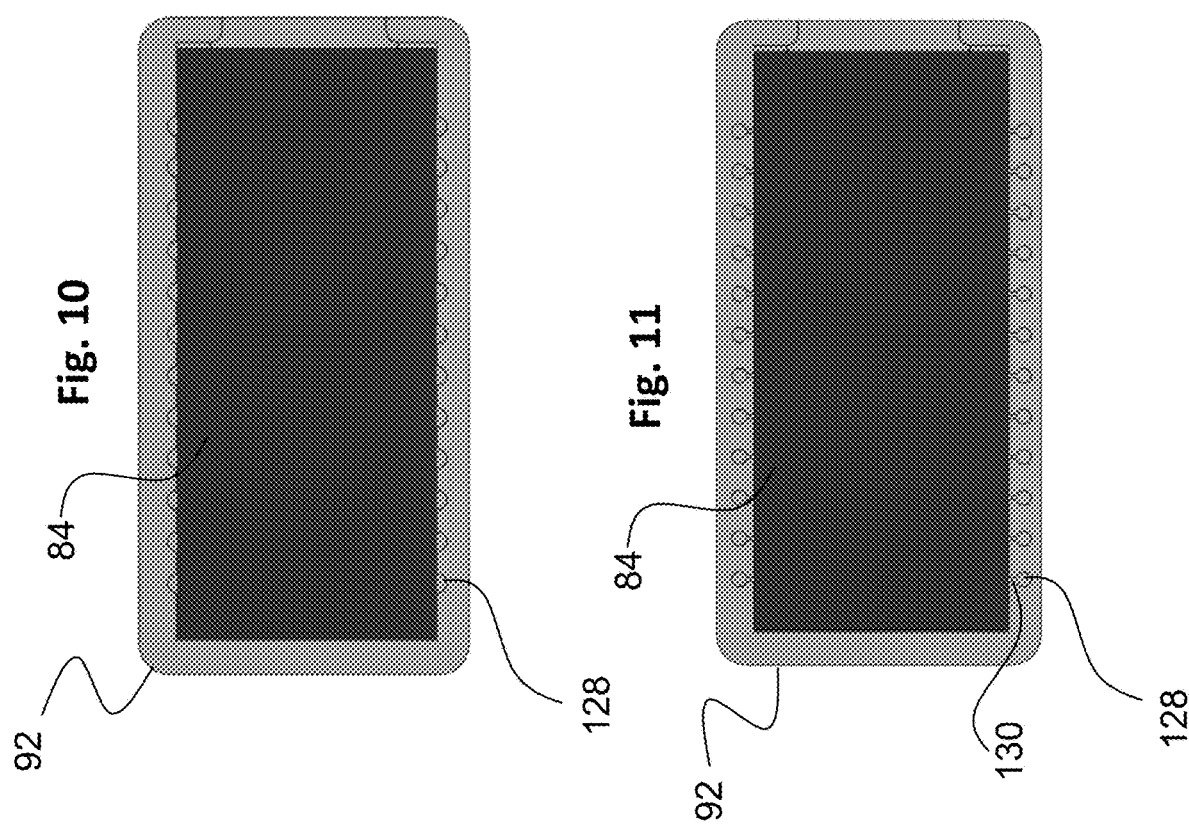

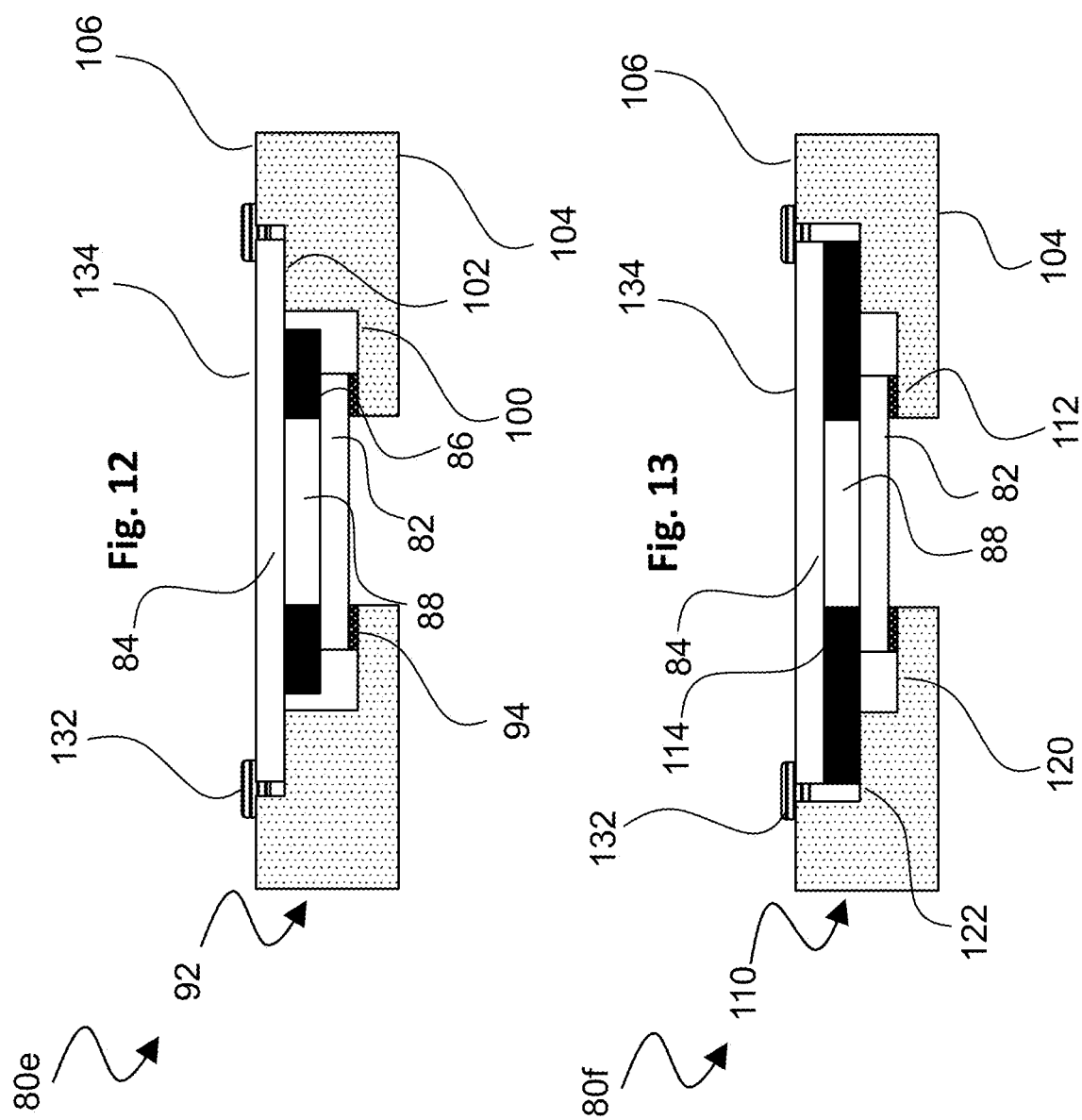

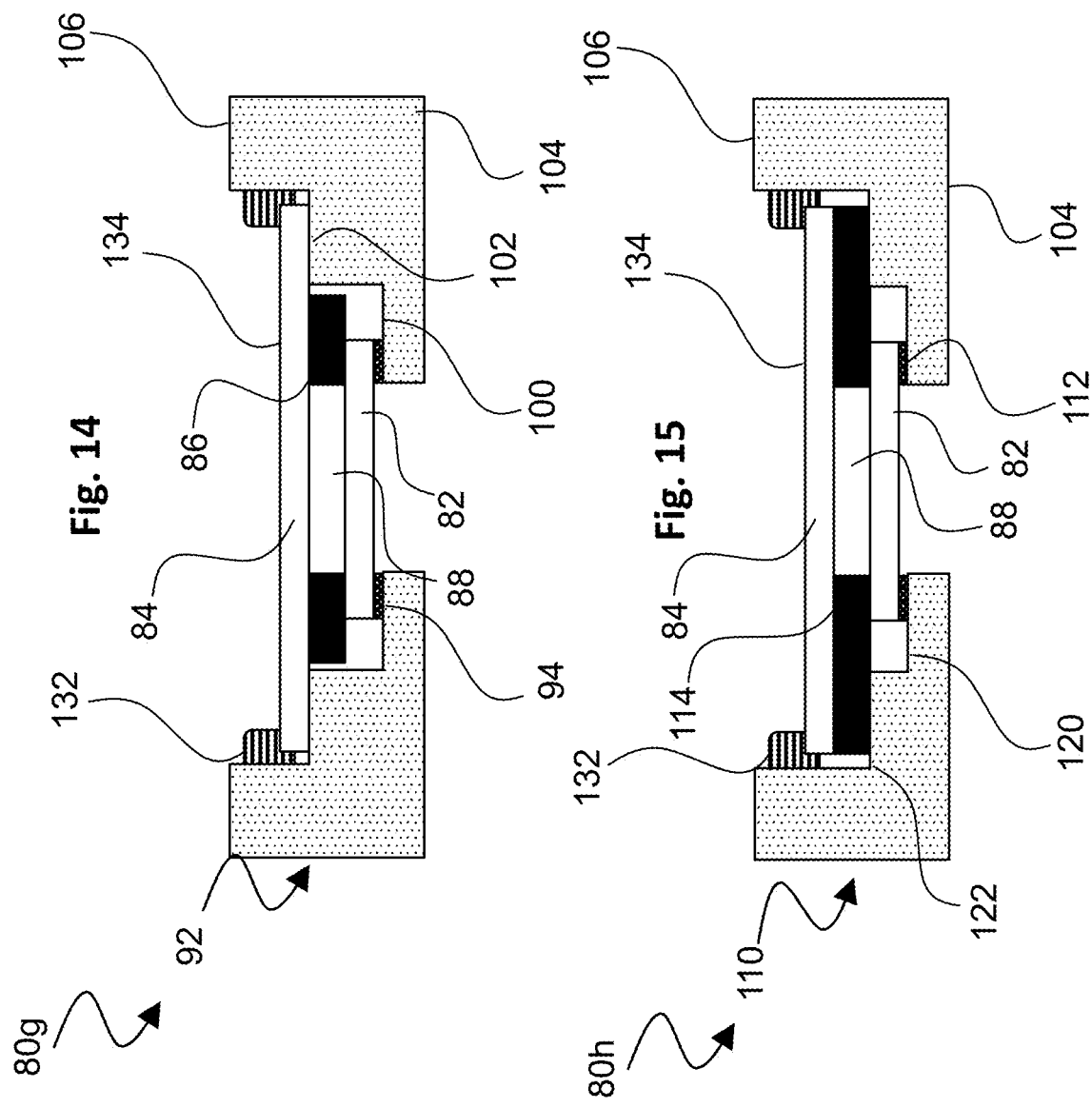

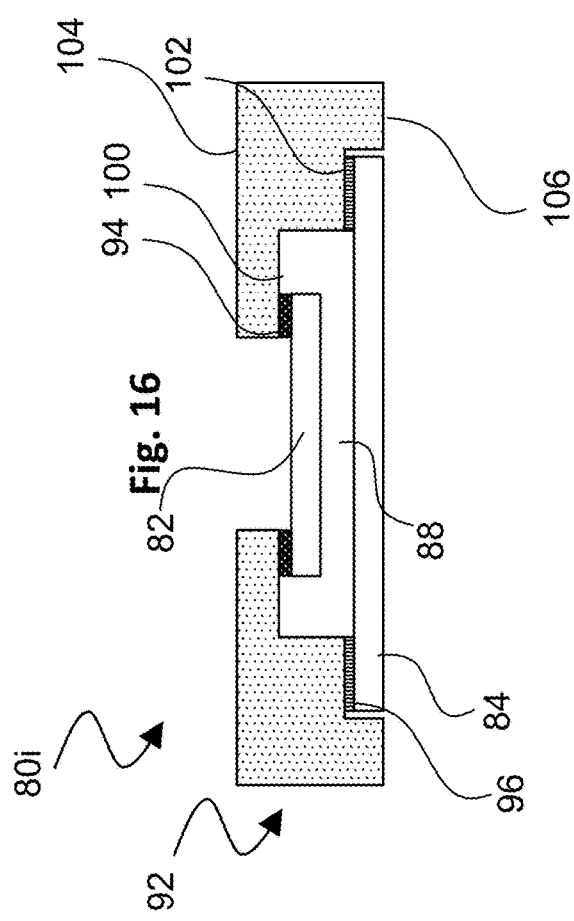
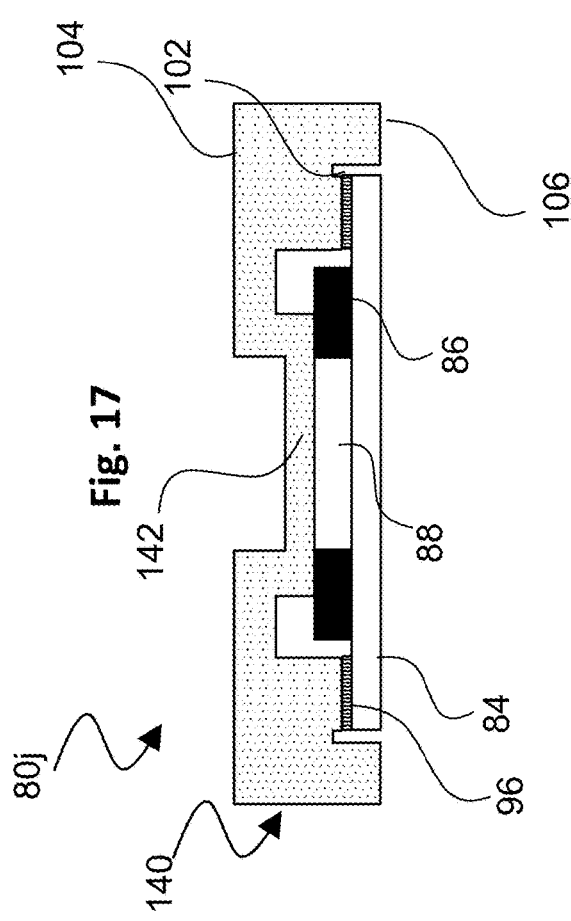

HOUSING FOR SIMPLE ASSEMBLY OF AN EWOD DEVICE

RELATED APPLICATION DATA

This application is a continuation-in-part application of U.S. application Ser. No. 15/647,562 filed on Jul. 12, 2017, the content of which is incorporated herein by reference.

TECHNICAL FIELD

The present invention relates to droplet microfluidic devices and their construction, and more specifically to Active Matrix Electro-wetting-On-Dielectric (AM-EWOD) devices, including housing structures for simplified assembly and configurations of such devices.

BACKGROUND ART

Electrowetting on dielectric (EWOD) is a well-known technique for manipulating droplets of fluid by the application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 shows a part of a conventional EWOD device in cross section. The device includes a lower substrate 10, the uppermost layer of which is formed from a conductive material which is patterned so that a plurality of array element electrodes 12 (e.g., 12A and 12B in FIG. 1) are realized. The electrode of a given array element may be termed the element electrode 12. A liquid droplet 14, including a polar material (which is commonly also aqueous and/or ionic), is constrained in a plane between the lower substrate 10 and a top substrate 16. A suitable gap or channel between the two substrates may be realized by means of a spacer 18, and a nonpolar surround fluid 20 (e.g. oil) may be used to occupy the volume not occupied by the liquid droplet 14. The function of the oil is to reduce the surface tension at the surfaces of the polar droplets, and to increase the electro-wetting force, which ultimately leads to the ability to create small droplets and to move them quickly. It is usually beneficial, therefore, for the oil to be present within the channel of the device before any polar fluids are introduced therein.

An insulator layer 22 disposed upon the lower substrate 10 separates the conductive element electrodes 12A, 12B from a first hydrophobic coating 24 upon which the liquid droplet 14 sits with a contact angle 26 represented by θ. The hydrophobic coating is formed from a hydrophobic material (commonly, but not necessarily, a fluoropolymer). On the top substrate 16 is a second hydrophobic coating 28 with which the liquid droplet 14 may come into contact. Interposed between the top substrate 16 and the second hydrophobic coating 28 is a reference electrode 30.

The contact angle θ is defined as shown in FIG. 1, and is determined by the balancing of the surface tension components between the solid-to liquid ($\gamma_{SL}$), the liquid-to non-polar surrounding fluid ($\gamma_{LG}$) and the solid to non-polar surrounding fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \qquad \text{(equation 1)}$$

In operation, voltages termed the EW drive voltages, (e.g. $V_T$, $V_0$ and $V_{00}$ in FIG. 1) may be externally applied to different electrodes (e.g. reference electrode 30, element electrodes 12, 12A and 12B, respectively). The resulting electrical forces that are set up effectively control the hydrophobicity of the hydrophobic coating 24. By arranging for different EW drive voltages (e.g. $V_0$ and $V_{00}$) to be applied to different element electrodes (e.g. 12A and 12B), the liquid droplet 14 may be moved in the lateral plane between the two substrates 10 and 16.

Example configurations and operation of EWOD devices are described in the following. U.S. Pat. No. 6,911,132 (Pamula et al., issued Jun. 28, 2005) discloses a two dimensional EWOD array to control the position and movement of droplets in two dimensions. U.S. Pat. No. 6,565,727 (Shenderov, issued May 20, 2003) further discloses methods for other droplet operations including the splitting and merging of droplets, and the mixing together of droplets of different materials. U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in AM display technologies.

The approach of U.S. Pat. No. 7,163,612 may be termed "Active Matrix Electrowetting on Dielectric" (AM-EWOD). There are several advantages in using TFT based thin film electronics to control an EWOD array, namely:

Electronic driver circuits can be integrated onto the lower substrate 10.

TFT-based thin film electronics are well suited to the AM-EWOD application. They are cheap to produce so that relatively large substrate areas can be produced at relatively low cost.

TFTs fabricated in standard processes can be designed to operate at much higher voltages than transistors fabricated in standard CMOS processes. This is significant since many EWOD technologies require electro-wetting voltages in excess of 20V to be applied.

FIG. 2 is a drawing depicting additional details of an exemplary AM-EWOD device 36 in schematic perspective, which may incorporate the layered structures in FIG. 1. The AM-EWOD device 36 has a lower substrate 44 with thin film electronics 46 disposed upon the lower substrate 44, and a reference electrode (comparable to reference electrode 30 above) is incorporated into an upper substrate 54. The electrode configuration may be reversed, with the thin film electronics being incorporated into the upper substrate and the reference electrode being incorporated into the lower substrate. The thin film electronics 46 are arranged to drive array element electrodes 48. A plurality of array element electrodes 48 are arranged in an electrode or element array 50, having X by Y array elements where X and Y may be any integer. A liquid droplet 52 which may include any polar liquid and which typically may be aqueous, is enclosed between the lower substrate 44 and the upper substrate 54 separated by a spacer 56, although it will be appreciated that multiple liquid droplets 52 can be present.

There are various configurations of housings utilized in the construction of EWOD devices, to support the substrates, internal electronics, and related components. For example, U.S. Pat. No. 9,011,662 (Wang et al, issued Apr. 21, 2015) describes an EWOD cartridge, including molded plastic components and active EWOD components, and associated assembly techniques. In such assembly, the lower EWOD substrate is always enclosed in some fashion. Typically, such assembly employs a two-part molded structure in which the separate parts are formed and subsequently fused together via ultrasonic welding, or a single part plastic piece is formed and then crimped around the lower EWOD substrate to hold the lower substrate in position. Also, a fluid seal is formed via the use of a gasket formed as part of the upper plastic part via over-molding. The configuration and related assembly of structures such as those described in U.S. Pat. No. 9,011,662, which is typical of the conventional art, results in a substantial number of complicated and expensive production techniques.

In conventional assembly techniques, typically the top and bottom substrates may be attached together on a large mother-glass from which multiple devices may be formed. Such an assembly process typically includes the attachment of top and bottom mother-glass substrates, and the formation of the spacer and seal regions on each individual device. Following the spacer and seal formation, the mother-glass may be cut into individual assembled devices, e.g. using a scribe and break method for cutting the glass substrates. Assembly at the mother-glass level has certain advantages, in particular that it facilitates the assembly of multiple devices at a time.

However, there are also significant disadvantages of mother-glass assembly. Specialized handling machinery on the production line is required to handle the processing of mother-glass pieces of the necessary large size. This specialized equipment is expensive and may not be suitable for certain facilities depending on size. In addition, it is typically required to pattern the hydrophobic coating layers in the region of the seal, for example to achieve good adhesion of sealant material (e.g. glue) to each substrate. The manufacturing process for creating a patterned hydrophobic layer at mother-glass scale is complex. Conventional housings and related manufacturing processes for EWOD devices, therefore, remain deficient.

SUMMARY OF INVENTION

The manner of assembly and construction of an EWOD or AM-EWOD device needs to be simplified while maintaining high overall performance of the resultant device. Accordingly, the present disclosure describes an enhanced device construction of an EWOD or AM-EWOD device and related assembly methods that facilitate device construction and assembly to provide a low-cost and simplified manner to assemble individual EWOD devices. Multiple devices, therefore, can be assembled efficiently without the disadvantages associated with conventional mother-glass level assembly.

As described above, an EWOD device (including an AM-EWOD device) typically includes two glass substrates which are held apart at a fixed distance by a spacer which separates the substrates at a well-defined gap (referred to as the cell gap) to form the EWOD channel. The cell gap of the EWOD channel needs to be formed with a high degree of parallelism of the two substrates to define a highly uniform EWOD channel, as such parallelism is a significant metric in the quality and functionality of the EWOD device. The more uniform the cell gap of the EWOD channel, the greater the accuracy and reproducibility of the volume of the droplets produced by the device and the greater the utility as an automatic and accurate droplet dispenser.

According to a common device construction, the spacer that is used to space the EWOD substrates at a fixed distance from each other also acts as the means of holding or fixing those two substrates in position relative to each other. In conventional configurations, the spacer could incorporate a double-sided adhesive, or the spacer could include a glue track with a certain percentage of spacer balls whose diameter define the cell gap. Alternatively, the spacer could include a dry sheet material cut to shape, with a thin layer of adhesive either side of the dry spacer. In these conventional configurations, the spacer performs two distinct functions: (1) a spacing function—the spacer spaces apart the EWOD substrates to form the EWOD channel with the desired cell gap; and (2) a fixing function—the spacer includes some form of structure (e.g., adhesive layer, glue) to fix the substrates together in the sense of holding the substrates in place so that the substrates cannot easily be taken apart or move during operation. Alternatively, the spacing and fixing functions can be achieved separately. For example, if space allows, there can be a dry spacer that accurately sets the EWOD channel cell gap, and a separate glue track which adheres the substrates together.

For the typical glass substrates, an additional surrounding plastic housing will very often be used to house the EWOD module. An additional plastic housing may: improve the ruggedness and ease of handling of the EWOD device to avoid significant contact with the glass; improve the appearance of the overall device; improve the ease of fluid interfacing to the device, for example by facilitating pipette guides and docks in the plastic, to aid fluid loading and extraction; and provide electrical and mechanical contact between the EWOD device and the drive electronics so that the device can be driven with electrical signals, and held stationary for the subsequent assay to be performed. Conventionally, use of a plastic housing in this manner has required a two-stage assembly process, including: (1) assembly and adhesion of the two glass substrates into a module; and (2) incorporation of the module into the plastic housing.

This present disclosure describes an EWOD device of simplified assembly, including an enhanced construction of a plastic housing that facilitates the spacing and fixing of the glass substrates, i.e., the housing configuration facilitates both the spacing and the fixing functions referenced above. A dry spacer performs the spacing function to define the cell gap, and a plastic housing is used to facilitate fixing the substrates in place. The spacing and fixing of the upper and lower substrates, and thus the definition of the cell gap of the EWOD channel defined by the substrates, is facilitated by the plastic housing. Accordingly, the plastic housing includes alignment and fixing features to facilitate the construction of the assembly. Examples of such features include: lateral alignment features for lateral alignment of the top and bottom substrates; vertical alignment features for positioning the substrates to define the vertical cell gap between the top and bottom substrates; adherence features for fixing the components of the EWOD device in place, which may include some or all of (a) adhesive surfaces, (b) structures to define glue channel inputs, and (c) mechanical adherence features; and sealing features for sealing the interior EWOD channel of the EWOD device for maintaining the inputted fluids within the EWOD channel. In exemplary embodiments, the top substrate and/or the spacer features may be pre-fabricated as part of, or pre-assembled into, the plastic housing prior to assembly with the bottom substrate.

An aspect of the invention, therefore, is an enhanced EWOD device having a housing with alignment features optimized for simplified assembly. In exemplary embodiments, the EWOD device includes a first substrate assembly and a second substrate assembly wherein the first and second substrate assemblies have opposing inner surfaces; and wherein one of the first or second substrate assemblies includes electrowetting electrodes, and the opposing inner surfaces of the first substrate assembly and the second substrate assembly are spaced apart to define a channel between the opposing inner surfaces of the first and second substrate assemblies; and a housing for receiving the first substrate assembly and the second substrate assembly, the housing comprising an alignment feature for locating at least one of the first and second substrate assemblies within the housing. The device further includes a fixing feature for fixing the first and second substrate assemblies within the housing. The second substrate assembly is located within the housing such that the second substrate assembly is an outer component of the EWOD device. The device further may include a spacer portion that spaces apart the opposing inner surfaces of the first substrate assembly from the second substrate assembly to define the channel between the first and second substrate assemblies. The spacer portion may be located between the first and substrate assemblies out of direct contact with the housing, or the spacer portion may be fixed to the housing with the second substrate assembly being fixed to the spacer by the fixing feature.

The alignment feature may comprise a plurality of alignment surfaces defined by the housing to guide the locating of one or more of the first substrate assembly, second substrate assembly, and spacer during assembly. The fixing feature may include a fixing material, such as a curable adhesive or curable glue that may be applied to form one or more fixing layers as guided by the alignment feature, to fix the components within the housing.

Another aspect of the invention is a related method of assembling such an EWOD device. In exemplary embodiments, the method may include the steps of: providing a housing for receiving a first substrate assembly and a second substrate assembly, the housing comprising an alignment feature for locating at least one of the first and second substrate assemblies within the housing; locating the first substrate assembly within the housing; locating the second substrate assembly within the housing, wherein at least one of the first and second substrate assemblies is located within the housing using the alignment feature; and applying a fixing material to form at least one fixing layer to fix the first and second substrate assemblies within the housing. The method of assembly further may include locating a spacer within the housing, wherein the spacer spaces apart the opposing inner surfaces of the first substrate assembly from the second substrate assembly to define the channel between the first and second substrate assemblies. The method further may include fabricating a spacer portion from a photoresist layer deposited on the second substrate assembly prior to locating the second substrate assembly within the housing, wherein the spacer portion spaces apart the opposing inner surfaces of the first substrate assembly and the second substrate assembly define the channel In exemplary embodiments, the first and second substrate assemblies, and the spacer when present, all are located within the housing prior to applying the fixing material that fixes the second substrate assembly in place. After locating the first and second substrate assemblies, and a spacer when present, within the housing, portions of the housing are spaced apart from an edge of the second substrate assembly to form fixing ports for applying the fixing material. The fixing material is applied through the fixing ports.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF DRAWINGS

FIG. 5A is a drawing depicting another exemplary method of assembling the EWOD device of FIG. 3, with each sub-view FIGS. 5A(a), 5A(b), 5A(c), 5A(d), and 5A(e) depicting an exemplary step of such method.

FIG. 6 is a drawing depicting a side cross-section view of another exemplary EWOD device in accordance with embodiments of the present invention.

FIG. 7 is a drawing depicting a side cross-section view of another exemplary EWOD device in accordance with embodiments of the present invention.

FIG. 8 is a drawing depicting a side cross-section view of another exemplary EWOD device in accordance with embodiments of the present invention.

FIG. 9 is a drawing depicting a side cross-section view of another exemplary EWOD device in accordance with embodiments of the present invention.

FIG. 10 is a drawing depicting a plan view of an exemplary EWOD device illustrating a configuration of fixing ports in accordance with embodiments of the present invention.

FIG. 11 is a drawing depicting a plan view of an exemplary EWOD device illustrating another configuration of fixing ports in accordance with embodiments of the present invention.

FIG. 12 is a drawing depicting a side cross-section view of another exemplary EWOD device in accordance with embodiments of the present invention.

FIG. 13 is a drawing depicting a side cross-section view of another exemplary EWOD device in accordance with embodiments of the present invention.

FIG. 14 is a drawing depicting a side cross-section view of another exemplary EWOD device in accordance with embodiments of the present invention.

FIG. 15 is a drawing depicting a side cross-section view of another exemplary EWOD device in accordance with embodiments of the present invention.

FIG. 16 is a drawing depicting a side cross-section view of another exemplary EWOD device in accordance with embodiments of the present invention.

FIG. 17 is a drawing depicting a side cross-section view of another exemplary EWOD device in accordance with embodiments of the present invention.

DESCRIPTION OF EMBODIMENTS

Figure 1:
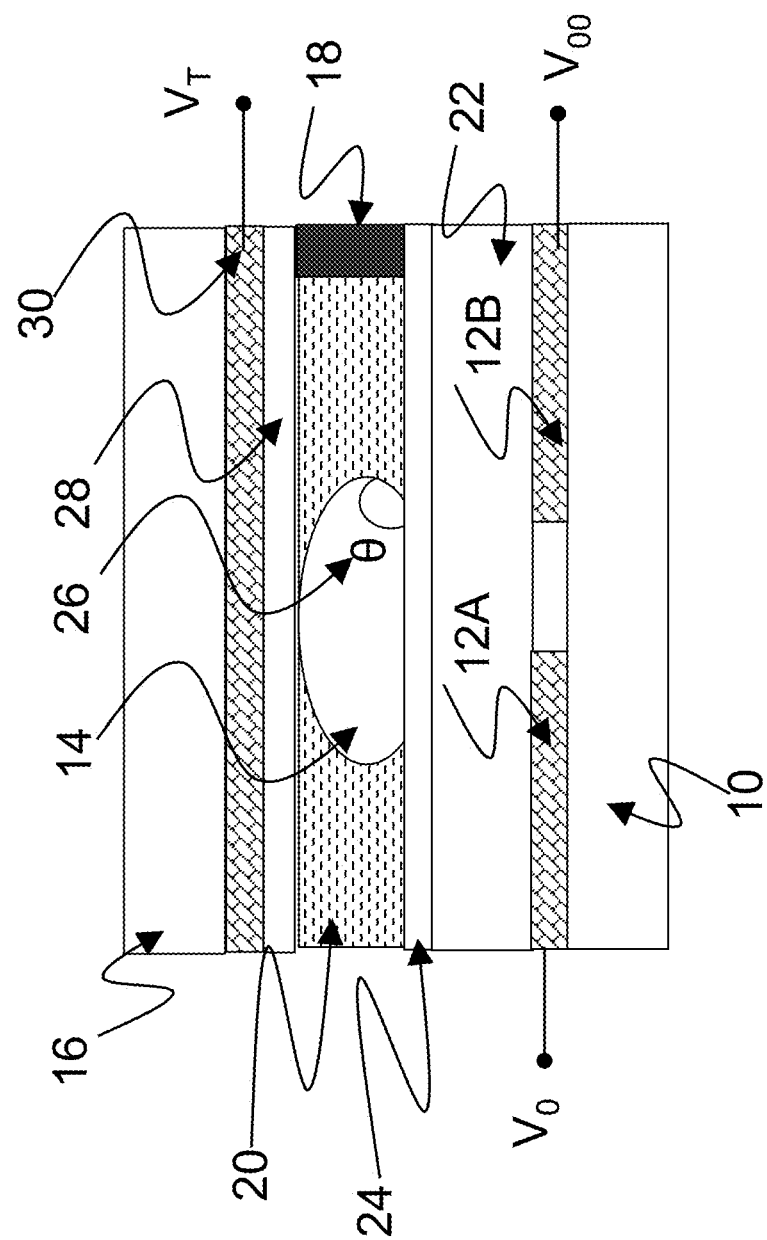
FIG. 1 is a drawing depicting a conventional EWOD device in cross-section.
Figure 2:
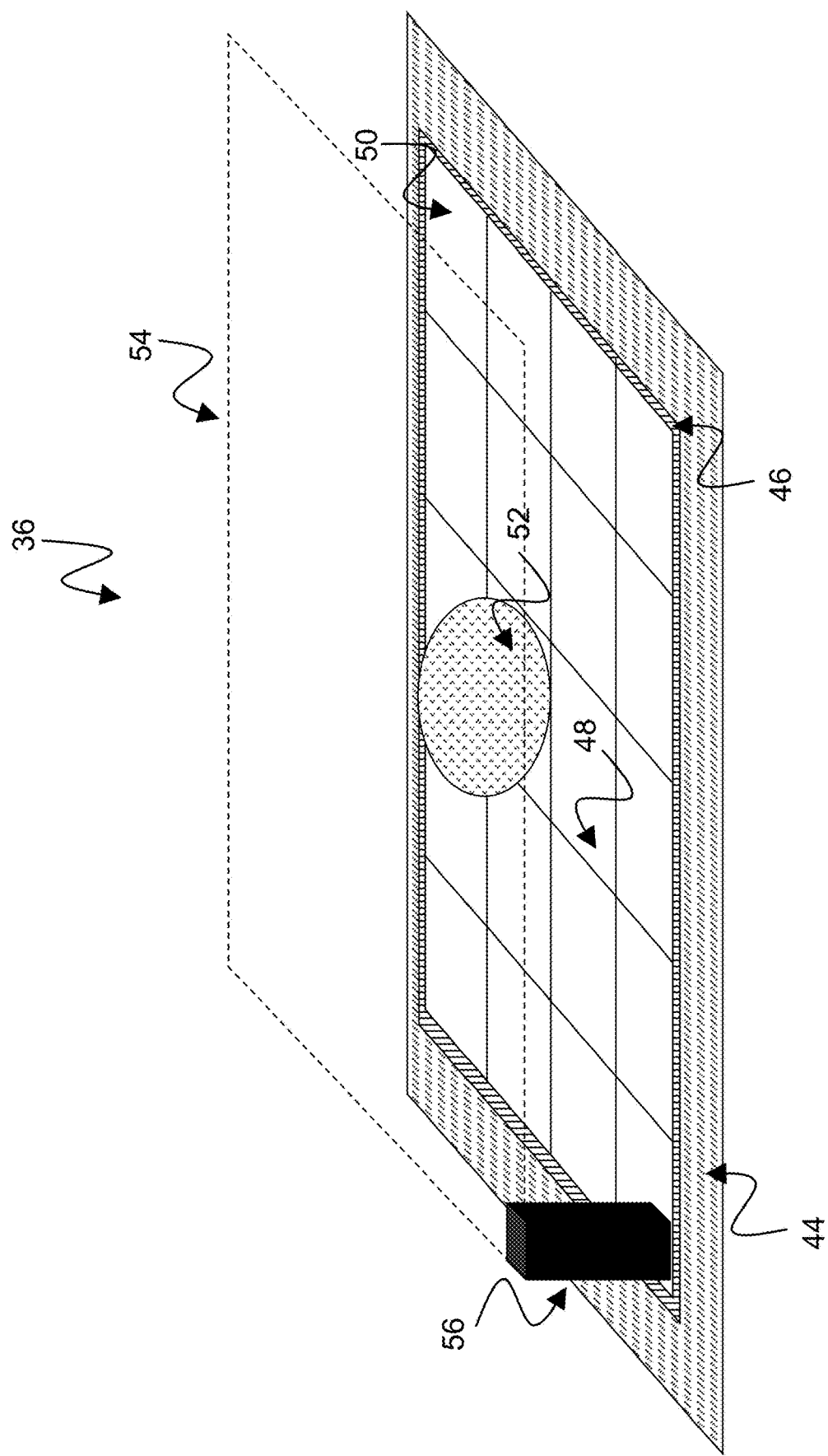
FIG. 2 is a drawing depicting an exemplary AM-EWOD device in schematic perspective.

Embodiments of the present invention will now be described with reference to the drawings, wherein like reference numerals are used to refer to like elements throughout. It will be understood that the figures are not necessarily to scale.

Figure 3:
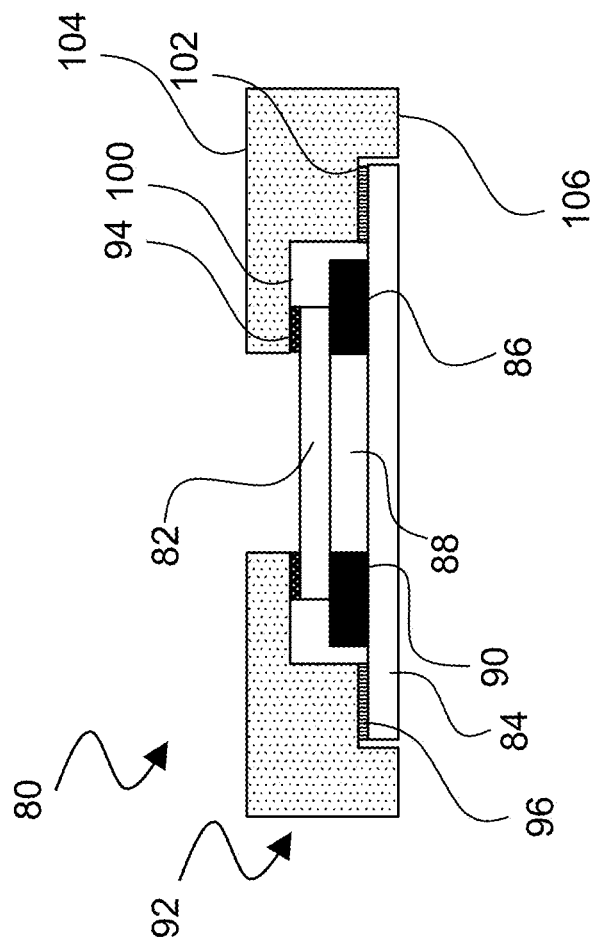
FIG. 3 is a drawing depicting a side cross-section view of an exemplary EWOD device in accordance with embodiments of the present invention.

FIG. 3 is a drawing depicting a side cross-section view of an exemplary EWOD device 80 in accordance with embodiments of the present invention. The EWOD device 80 includes a first or upper substrate assembly 82 and a second or lower substrate assembly 84. The first/upper and second/lower substrate assemblies have inner opposing surfaces that are separated by a spacer or spacer portion 86 to form a cell gap or EWOD channel 88. In this manner, the spacer/spacer portion 86 positions the first substrate assembly and the substrate assembly to space apart the first substrate assembly inner surface from the second substrate assembly inner surface to define the EWOD channel 88 between the opposing inner surfaces of the first and second substrate assemblies. For simplicity of illustration of pertinent features, the individual layers of the EWOD device components are omitted. Accordingly, the first and second substrate assemblies may include the associated glass substrate layers, insulating layers, electrode layers, and related structures that form the EWOD device as are known in the art. Typically, the second (lower) substrate assembly 84 constitutes the TFT substrate that would include the thin film electronics, with the first (upper) substrate assembly 82 incorporating the reference electrode. This, however, may be reversed with the first (upper) substrate assembly 82 constituting the TFT substrate and the second (lower) substrate assembly 84 incorporating the reference electrode.

The spacer 86 is configured to have a desired width or thickness so as to correctly position the substrates relative to each other to define an EWOD channel 88 between opposing inner surfaces of the two substrate assemblies. The spacer 86 may rest on one of the substrates, such as the lower substrate 84, and the spacer has at least regions 90 that extend into the EWOD channel 88 and thus are in contact with both substrates so as to properly space the substrates apart (i.e., perform the spacing function) to form the EWOD channel of a desired cell gap. Example materials for the spacer can include suitable rigid sheet plastics, such as for example polycarbonate, PET, polystyrene, polyester, polyimides (e.g. Kapton, Cirlex), or Mylar. The spacer may also have one or more adhesive layers, i.e. be a single or double-sided tape. Alternatively, a spacer portion 86 may be formed integrally with one of the substrate assemblies, and is particularly suitable for fabrication on the lower substrate 84. In integral fabrication embodiments, the spacer portion 86 may be fabricated as an integral part of the lower substrate, such as, for example, being formed from a photoresist or other pattern-able layer that is deposited onto the lower substrate. As such, this layer would be considered part of the lower substrate, and the spacer portion is not provided as a separate component that needs to be assembled and aligned relative to the lower substrate. Rather, for an integral fabrication, alignment of the spacer portion is performed at the point of fabricating said spacer portion (e.g. by photo lithography). Suitable photoresist materials include (but are not limited to) SU8 and Ordyl dry film photoresist. Throughout herein, the terms spacer and spacer portion are used interchangeably as encompassing either a separate element or an integrally fabricated element.

Generally, an aspect of the invention is an enhanced EWOD device having a housing with alignment features optimized for simplified assembly. In exemplary embodiments, the EWOD device includes a first substrate assembly and a second substrate assembly wherein the first and second substrate assemblies have opposing inner surfaces; and wherein one of the first or second substrate assemblies includes electrowetting electrodes, and the opposing inner surfaces of the first substrate assembly and the second substrate assembly are spaced apart to define a channel between the first and second substrate assemblies; and a housing for receiving the opposing inner surfaces of the first substrate assembly and the second substrate assembly, the housing comprising an alignment feature for locating at least one of the first and second substrate assemblies within the housing. The device further includes a fixing feature for fixing the first and second substrate assemblies within the housing. The second substrate assembly is located within the housing such that the second substrate assembly is an outer component of the EWOD device. The device further may include a spacer portion that spaces apart the opposing inner surfaces of the first substrate assembly from the second substrate assembly to define the channel between the first and second substrate assemblies. The spacer portion may be located between the first and substrate assemblies out of direct contact with the housing, or the spacer may be fixed to the housing with the second substrate assembly being fixed to the spacer by the fixing feature.

The alignment feature may comprise a plurality of alignment surfaces defined by the housing to guide the locating of one or more of the first substrate assembly, second substrate assembly, and spacer during assembly. The fixing feature may include a fixing material, such as a curable adhesive or curable glue that may be applied to form one or more fixing layers as guided by the alignment feature, to fix the components within the housing.

Referring to FIG. 3, the EWOD device 80 further includes a plastic housing 92 with an exemplary configuration of the fixing feature as fixing layers of a fixing material. In the example of FIG. 3, the upper substrate assembly 82 is fixed to the plastic housing 92 via a first fixing layer 94. In addition, the lower substrate 84 also is fixed to the plastic housing 92 via a second fixing layer 96. By fixing both substrate assemblies directly to the housing, the spacer 86 is essentially locked between the two substrate assemblies without requiring any additional fixing mechanism for the spacer. As such, the spacer 86 of this embodiment also is referred to as a "dry spacer" meaning that there is no adhesive or other fixing mechanism applied to or otherwise associated specifically with the spacer 86. Rather, the positioning and fixing of the spacer 86 is achieved as a result of the positioning and fixing of the substrate assemblies relative to the housing to define the cell gap of the EWOD channel 88. In the positioning of this particular embodiment, the spacer is located between the first and second substrates out of direct contact with the housing along at least a portion of the spacer, as shown in FIG. 3.

The first and second fixing layers 94 and 96 may be formed in a variety of ways, examples of which are set forth herein. It will be appreciated that such examples are non-limiting, and any suitable materials and configurations may be employed. For example, the fixing layers may be formed as a doubled-sided tape. Suitable tape configurations may include a tape material that has two layers of a modified solvent-acrylate adhesive on either side of a PET or PVC carrier film. Adhesive glue layers may be employed as another example. Ultraviolet (UV) curable glues or UV curable adhesives in particular may be employed, such as for example UV curable epoxy, acrylic, silicone, cyanoacrylate, and anaerobic glues or adhesives. Other curable glues or adhesives may be employed, such as for example materials that are thermally cured, or cured by exposure to moisture, pressure, or via a chemical reaction of two-part mixtures.

Figure 4:
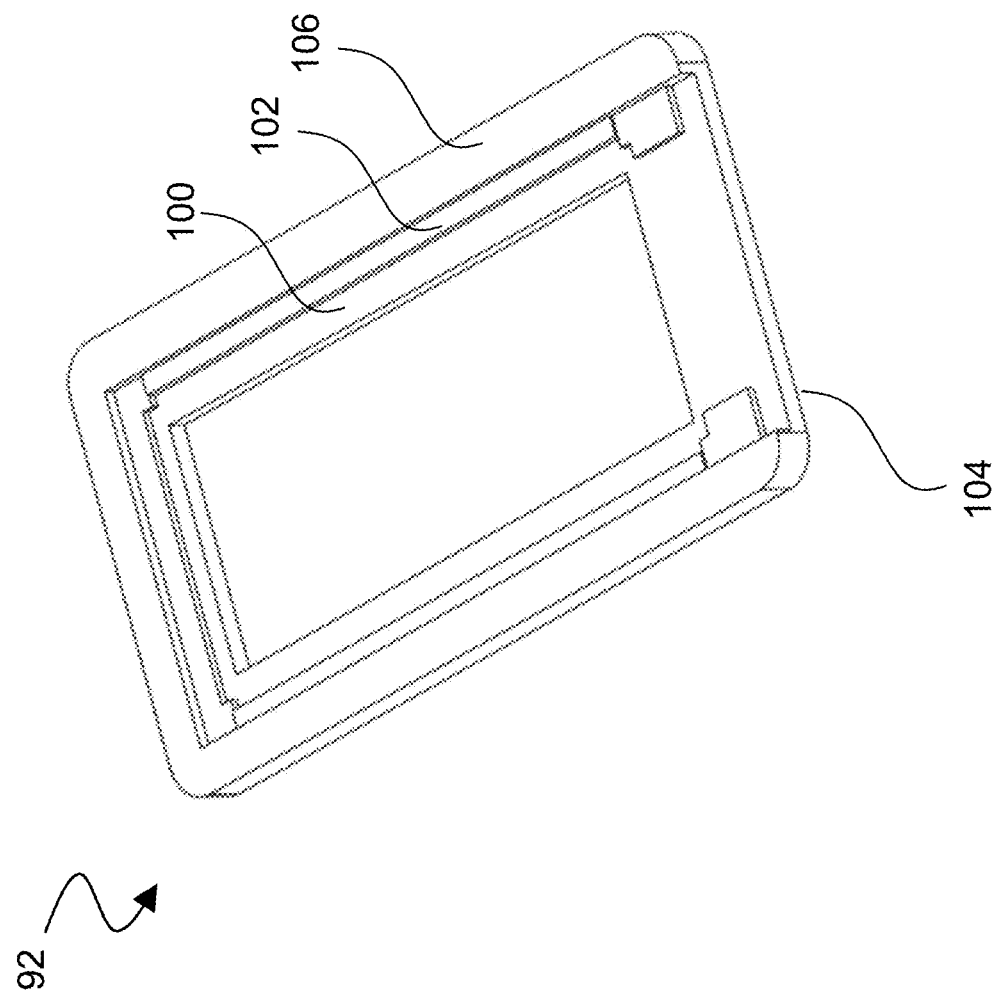
FIG. 4 is a drawing depicting an isometric view of an exemplary housing for use in the EWOD device of FIG. 3.

FIG. 4 is a drawing depicting an isometric view of the exemplary configuration of housing 92, as viewed generally from the underside. Generally, the housing 92 may be configured for aligning the two substrate assemblies 82 and 84, and by result the dry spacer 86, with respect to each other in the manner of an assembly jig. With such configuration, the EWOD device 80 can be easily assembled at the single device level, without having to employ mother-glass level construction.

In exemplary embodiments, the housing 92 may include a plurality of alignment features to properly align the first and second substrate assemblies and/or spacer. Referring to the example of FIGS. 3 and 4, the housing 92 may include a first substrate alignment surface 100 and a second substrate alignment surface 102. The housing 92 further may include a first or upper outer surface 104, and a second or bottom outer surface 106. Generally, the referenced surfaces of the housing 92 form a stepped alignment configuration on the underside of the housing 92.

With the stepped configuration of the housing 92, a significant feature is that the separation of the two substrate assemblies 82 and 84, within the expanse between the first substrate alignment surface 100 and the second substrate alignment surface 102, may be determined by the thickness of the dry spacer 86 to define the EWOD channel cell gap. In other words, such separation generally is not constrained by any given plastic housing configuration. Due to the manner of manufacturing of typical plastic housings, non-uniformities can be present in the housing. These non-uniformities can manifest as surface roughness, or deviations from precise parallelism of the housing surfaces. Such non-uniformities of the housing can result in deviations of resultant parallelism of the substrate assemblies in the assembled EWOD device, in turn leading to non-uniformities of the cell gap of the EWOD channel. Accordingly, the design of a given housing 92 does not control the cell gap of the EWOD channel. Instead, the fixing plane of the housing where the second substrate alignment surface 102 is located (and where the second fixing layer 96 is applied) should be within a distance of the bottom substrate assembly that can be filled easily with the fixing layer material, so that the fixing material (e.g., glue or adhesive) fills and accommodates any non-uniformities in the plastic of the housing. As a result, a high level of parallelism of the substrate assemblies is achieved in the assembled EWOD device 80, resulting in a highly uniform cell gap of the EWOD channel 88.

In addition, based on the stepped configuration of the alignment features, the second substrate assembly is located within the housing such that the second substrate assembly is an outer component of the EWOD device. In this particular example, outer surfaces of the second substrate assembly and the housing are essentially flush with each other, although this need not be the case.

To accurately apply the fixing layer 96 properly in the fixing plane formed by the second substrate alignment surface 102, the use of a low viscosity curable adhesive or glue may be selected from among the fixing materials described above. With use of a low viscosity curable material, the material will flow freely to accommodate any non-uniformities of the housing 92 at the fixing plane. The optional use of a suitable amount of applied pressure and/or applying pressure with a weighting block may improve the EWOD substrate parallelism. Referring to FIG. 3, with the use of a low viscosity adhesive material, if the adhesive comes into contact with the spacer, the adhesive material may wick underneath the spacer by capillary action, and therefore possibly enter into the EWOD channel of the device in a small amount. This does not interfere with the operation of the EWOD device, and indeed may be useful for holding the spacer in position so that the spacer cannot move during device operation.

Figure 5:
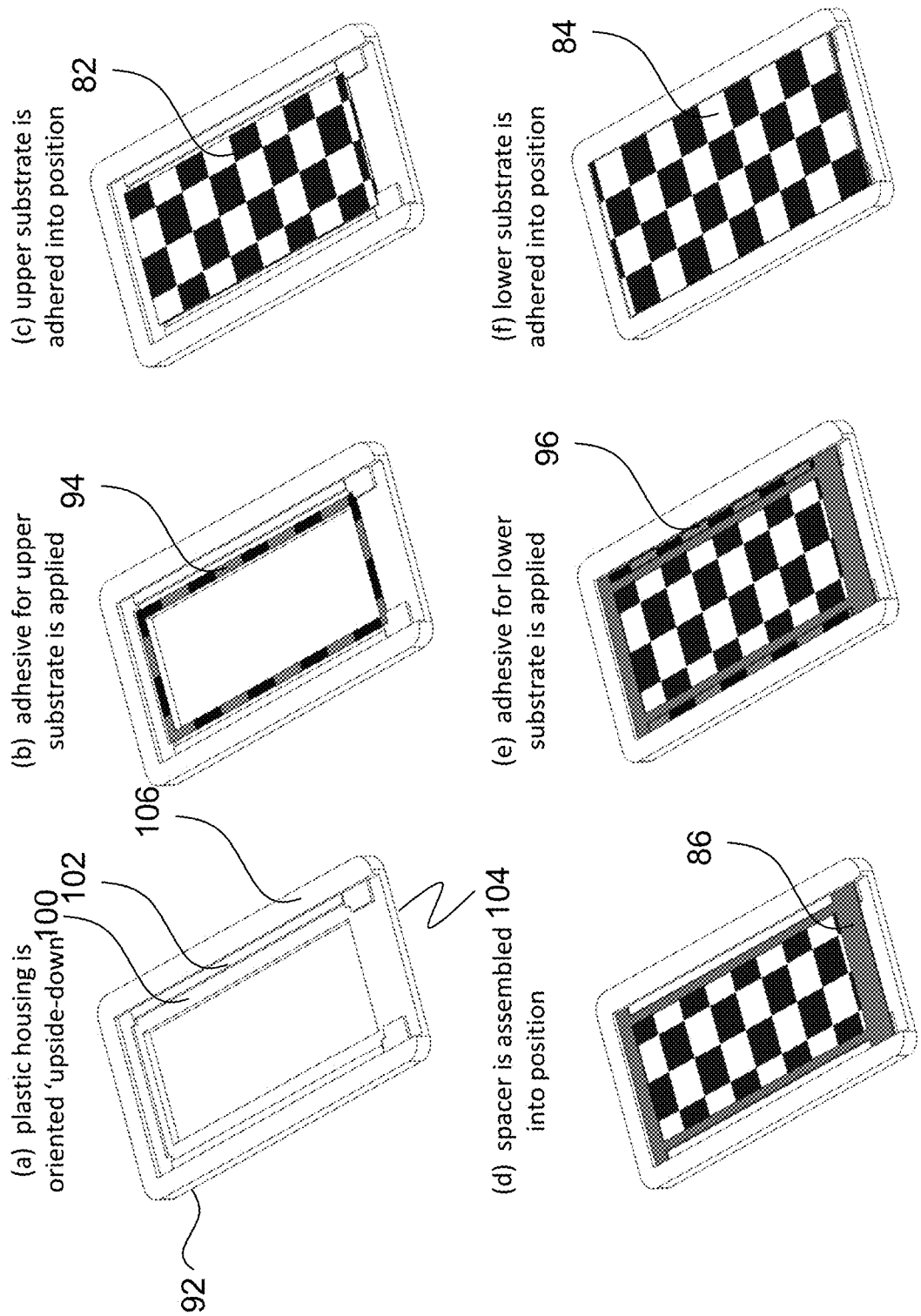
FIG. 5 is a drawing depicting an exemplary method of assembling the EWOD device of FIG. 3, with each sub-view FIGS. 5(a), 5(b), 5(c), 5(d), 5(e), and 5(f) depicting an exemplary step of such method.

FIG. 5 is a drawing depicting an exemplary method of assembling the EWOD device 80, with each view (a)-(f) depicting an exemplary step of such method. In a Step (a), housing 92 is provided and is oriented to access the underside having the alignment features described above. In a Step (b), the first fixing layer 94 may be applied to a fixing plane formed by the first substrate alignment surface 100. In a Step (c), the first or upper substrate assembly 82 is positioned on the first fixing layer 94 as supported by the first substrate alignment surface 100. In a Step (d), the spacer 86 is positioned against the upper substrate assembly 82 in a "dry" manner, i.e., without the addition of any fixing material applied to the spacer. In a Step (e), the second fixing layer 96 may be applied to a fixing plane formed by the second substrate alignment surface 102. In a Step (f), the second substrate assembly 84 is positioned on the second fixing layer 96 as supported by the second substrate alignment surface 102. Again, based on the stepped configuration of the alignment features, the second substrate assembly is located within the housing such that the second substrate assembly is an outer component of the EWOD device in the resultant configuration. In this particular example, the second substrate assembly 84 resides at a position essentially flush with the bottom outer surface 106 of the housing (see also FIG. 3), and thus the second substrate assembly 84 essentially is contained within the cornered alignment feature defined between the second substrate alignment surface 102 and the bottom outer surface 106. The assembled EWOD device 80 may then be cured to set the fixing layers in embodiments in which curable adhesives or curable glues are employed as the fixing material.

FIG. 5A is a drawing depicting another exemplary method of assembling the EWOD device 80, with each view (a)-(e) depicting an exemplary step of such method. The method of FIG. 5A differs from that of FIG. 5 in that the method of FIG. 5A utilizes an integral lower substrate/spacer portion in which the spacer portion has been pre-formed on the lower substrate using an integral fabrication method, such as by forming the spacer portion from a photoresist layer as described above. In such method, therefore, the spacer portion is integral with the lower substrate, the spacer portion being previously formed thereon by photolithography or a comparable process. Accordingly, steps (a)-(c) proceed in the method of FIG. 5A as in the method of FIG. 5. When the spacer portion is integrated into the lower substrate (which typically is the TFT substrate), there is a simplified assembly process in which step (d) from FIG. 5 (positioning the spacer) is eliminated in the method of FIG. 5A. Rather, the spacer portion, being integral with the lower substrate, is automatically assembled into the device during incorporation of the lower substrate assembly at step (e) of FIG. 5A. It will be appreciated that when the spacer portion is either a single-sided or double-sided tape, assembly similarly may be performed by applying the tape to the lower substrate, and then assembling the combined lower substrate/spacer portion into the device in step (e) of FIG. 5A.

When the spacer material is a double-sided tape, assembly may be performed by assembling the upper and lower substrate assemblies together via the spacer portion having an adhesive layer on either side before assembling substrate assemblies into the broader device. This assembly method may be employed to form the device structure having the configuration, for example, of FIG. 7 described below.

The described configuration and manner of assembly of an EWOD or AM-EWOD 80 is simplified as compared to conventional methods, while maintaining a highly uniform cell gap of the EWOD channel for effective performance of the device. This is accomplished using common materials as are known in the art, which are low cost and easy to manipulate for assembly of individual devices in an efficient manner. Multiple EWOD devices, therefore, can be assembled efficiently without the disadvantages associated with the costs and complexities of conventional mother-glass level assembly. The configuration of the housing and its relation to the other device components further performs both the spacing and the fixing functions in an effective manner to optimize the cell gap of the EWOD channel while fixing the various components in place.

Subsequent figures illustrate structural and assembly variations to the above. For ease of illustration, like structures are identified with like reference numerals as in the previous figures and generally are comparably configured. Additional explanation is provided as to the structural differences among the various embodiments. Relatedly, the various embodiments of the EWOD device generally will operate as described above, with certain modifications based on the structural variations as detailed below.

FIG. 6 is a drawing depicting a side cross-section view of another exemplary EWOD device 80a in accordance with embodiments of the present invention, having a variation of the fixing feature. In this embodiment, the first fixing layer 94 is omitted, such that the upper substrate 82 is not adhered directly into position using any type of distinct adhesive or glue layer of fixing material. Rather, the upper substrate 82 is simply placed into the associated alignment feature in the plastic housing 92 formed at the first substrate alignment surface 100. The fixing layer 96 is present comparably as in the previous embodiment at the second substrate alignment surface 102, to provide a fixing plane for adhering the second substrate assembly 84 to the housing 92. Accordingly, only adhesion associated with the bottom substrate 84 to the housing 92 is maintained, as shown in FIG. 6. This embodiment may be appropriate when it is not required to form a seal between the upper substrate and the housing, for example when a user does not need to extract any fluid from the EWOD device during or at the end of the assay to be performed. For such circumstances, the embodiment of FIG. 6 has an advantage of one less assembly step to be performed with less fixing material being used, lowering the cost and complexity of assembly of the EWOD device.

FIG. 7 is a drawing depicting a side cross-section view of another exemplary EWOD device 80b in accordance with embodiments of the present invention. In this embodiment, which may be preferable due to space limitations in certain situations, the lower substrate assembly 84 is not fixed to the plastic housing directly, but is fixed to the housing indirectly via directly fixing the second substrate assembly to the spacer as shown in FIG. 7. In this configuration, the fixing feature includes fixing layers that are provided on opposing faces of the spacer, and the fixing layer between the spacer and the lower substrate assembly may extend into the EWOD channel 88 as also shown in FIG. 7.

Referring to the example as depicted in FIG. 7, the EWOD device 80b may include a plastic housing 110. In the example of FIG. 7, the upper substrate assembly 82 is fixed to the plastic housing 110 via a first fixing layer 112. A spacer 114 is shaped differently in this embodiment so as to extend to an edge of the bottom substrate 84 along at least some portions of the spacer. Accordingly, the spacer 114 in this embodiment is fixed to the plastic housing 110 via a second fixing layer 116, and lower substrate assembly 84 is fixed directly to the spacer 114 via a third fixing layer 118. The fixing layers 116 and 118, therefore, are located on opposing surfaces of the spacer 114 to fix the spacer directly to both the housing 110 and the lower substrate assembly 84 at said opposing faces of the spacer. The fixing layers may be formed comparably as in previous embodiments using comparable materials.

Because of the manner of fixing the spacer 114 via the second and third fixing layers 116 and 118, the stepped configuration of alignment surfaces may have somewhat different dimensions as compared to the embodiment of FIG. 3. Referring to the example of FIG. 7, the housing 114 may include a first substrate alignment surface 120, which is similar to the first substrate alignment surface 100 of previous embodiments. The housing 110 further may include a spacer alignment surface 122, which is dimensionally different from the second substrate alignment surface 102 of previous embodiments insofar as the spacer is fixed to both the housing and the bottom substrate. During assembly, therefore, the second fixing layer 116 is applied to the spacer alignment surface 122, followed by placing of the spacer 114, followed by applying the third fixing layer 118. The bottom substrate layer 84 is then fixed via the third fixing layer 118.

Alternatively, the second and third fixing layers may be incorporated as part of the spacer 114 prior to assembly of the overall EWOD device 80b. This may be performed by forming the spacer as a double-sided tape, with adhesive tape layers being provided on opposing surfaces of a base spacer body. A double-sided tape spacer configuration may be employed in any of the embodiments described herein in which the spacer is fixed directly to both the housing 110 and the lower substrate assembly 84 at opposing faces of the spacer.

FIG. 8 is a drawing depicting a side cross-section view of another exemplary EWOD device 80c in accordance with embodiments of the present invention, which bears structural similarity to the embodiment of FIG. 3. In the embodiment of FIG. 8, portions 124 of housing 92 are spaced apart from an edge 126 of the bottom substrate 84 to form fixing ports 128. During assembly, fixing material 125 for the second fixing layer 96 may be applied through the fixing ports 128 to form said second fixing layer 96 using an application instrument 127 (e.g., pipette or comparable device). For the method of assembly in this embodiment, in contrast to previous embodiments, the fixing material, such as the adhesive or glue, is not applied to the bottom substrate or spacer before such components are inserted into the assembly. Rather, the spacer 86 and the bottom substrate assembly 84 are inserted dry into the position for assembly, and then the fixing material is subsequently applied to the device though the fixing ports 128. If a low viscosity glue or adhesive is used as the fixing material, it will fill into the relevant gaps by capillary action, and can be set properly upon curing after the filling is complete. In this embodiment, it may be advantageous to include the fixing ports within the plastic housing to allow the fixing material to be applied at the correct position to facilitate the capillary filling, as shown in FIG. 8. The fixing material can, for example, be applied automatically during the assembly process, such as by using a programmable gluing robot.

Comparable principles may be applied to the assembly configuration of FIG. 7, in which the housing and the bottom substrate are fixed to opposing faces of the spacer. Accordingly, FIG. 9 is a drawing depicting a side cross-section view of another exemplary EWOD device 80*d* in accordance with embodiments of the present invention, which bears structural similarity to the embodiment of FIG. 7. In the embodiment of FIG. 9, the portions 124 of housing 92 likewise are spaced apart from an edge 126 of the bottom substrate 84 to form fixing ports. In addition, for this embodiment, it may be advantageous to have first fixing ports 128*a* and second fixing ports 128*b* at different depths within the housing, as shown in FIG. 9. In this manner, fixing ports 128*a* may be employed to form the second fixing layer 116, and fixing ports 128*b* may be employed to form the third fixing layer 118.

In the embodiment of FIGS. 8 and 9, therefore, at least the second substrate assembly is located dry within the housing prior to applying the fixing material that fixes the second substrate assembly in place. The first substrate assembly and the spacer similarly may be applied dry. After locating the first and second substrate assemblies and spacer within the housing, portions of the housing are located spaced apart from an edge of the second substrate assembly to form fixing ports for applying the fixing material, and the fixing material is applied through the fixing ports. The configuration of the fixing ports 128 (including ports 128*a* and 128*b*) may be varied, so long as the ports allow for glue or other adhesive to be delivered to the correct part of the EWOD device during assembly. For example, the fixing ports 128 may be formed as openings adjacent to the bottom substrate assembly 84, as shown in FIG. 10. It also may be advantageous to apply the glue or other adhesive remotely from the EWOD substrates into ports 128 and allow the glue to run along tracks 130 in the plastic housing that lead to the edge of the bottom substrate assembly, as shown in FIG. 11. The tracks optionally can be inclined so that the glue or adhesive preferentially runs towards the EWOD substrates.

Relatedly, it may be advantageous to be use different types of adhesives in different areas of the device. For example, it may be advantageous to use a flexible adhesive to adhere the upper substrate to the plastic housing, to accommodate any difference in thermal expansion between the glass and the plastic, whereas it may be preferable to use a different type of adhesive between the housing and the spacer and/or the spacer and the bottom substrate, as the fixing material in these areas may have an impact on the cell gap of the EWOD channel. In particular, it may be useful to use an adhesive with low thermal expansion in these regions of the device.

FIG. 12 is a drawing depicting a side cross-section view of another exemplary EWOD device 80*e* in accordance with embodiments of the present invention, which bears structural similarity to the embodiment of FIG. 3. In this embodiment, however, a second fixing layer 132 is formed differently as compared to the second fixing layer 96 of FIG. 3. Rather, in this embodiment the second fixing layer 132 is formed to fix the lower substrate assembly 84 into position on its bottom outer surface 134 to the housing 92, as illustrated in FIG. 12. This adhesion is better achieved using a fixing material selected from those described above that is a high viscosity glue or adhesive that can form a bead that adheres the bottom surface 134 of the lower substrate 84 to the bottom outer surface 106 of the plastic housing 92, thereby holding the bottom substrate in position. This embodiment has an advantage in that it is not necessary to pattern a hydrophobic layer on the upper surface of the lower substrate to hold the EWOD device together in a robust fashion. Rather, there simply should not be any hydrophobic coating on the bottom outer surface of the lower substrate assembly at points at which the high viscosity glue or adhesive is applied.

Comparable principles may be applied to the EWOD device configuration of FIG. 7, in which the housing and the bottom substrate are fixed to opposing faces of the spacer. Accordingly, FIG. 13 is a drawing depicting a side cross-section view of another exemplary EWOD device 80*f* in accordance with embodiments of the present invention, which bears structural similarity to the embodiment of FIG. 7. Similarly as in FIG. 12, in the embodiment of FIG. 13 the second fixing layer 132 is formed to fix the lower substrate assembly 84 into position at its bottom surface 134 to the bottom outer surface 106 of the housing 92 using a high viscosity glue or adhesive of sufficient viscosity to form a bead. In this example, the spacer 114 is configured with a double-sided tape configuration as referenced above, and so the specific fixing layers 116 and 118 shown in FIG. 7 optionally are absent as shown in the example shown in FIG. 13.

The embodiments of FIGS. 12 and 13 have an advantage in that the glass parts of the device (upper and lower substrate assemblies) may be formed at a mother-glass level, and then the mother-glass may be diced up into individual glass modules before assembling the glass modules into the plastic housing. Fixing material ports (similar to ports 128 at shown in FIGS. 8-11) may be provided to direct the more viscous fixing material used in the embodiments of FIGS. 12 and 13.

The design of the plastic housing could either be so that the bottom outer surface 106 of the plastic housing is substantially flush with the bottom surface 134 of the lower EWOD substrate 84, as in FIGS. 12 and 13, or so that the bottom outer surface 106 of the plastic housing extends substantially beyond the bottom surface 134 of the lower EWOD substrate 84. Such a configuration is shown for example in FIG. 14, which depicts an EWOD device 80*g* comparable to EWOD device 80*e* of FIG. 12, and in FIG. 15, which depicts and EWOD device 80*h* comparable to EWOD device 80*f* of FIG. 13. With such configuration, fixing layer 132 takes the form of a bead of fixing material that does not protrude below the bottom edge of the complete EWOD device 80*g*/80*h*.

FIG. 16 is a drawing depicting a side cross-section view of another exemplary EWOD device 80*i* in accordance with embodiments of the present invention. In this embodiment, a tolerance on the plastic housing is sufficiently tight that the dry spacer is no longer needed to define the proper cell gap during device use, and hence all is that is needed is to adhere the top and bottom substrate assemblies 82 and 84 to the plastic housing 92, as shown in FIG. 16. This embodiment has an advantage in that there is one less piece (i.e., the spacer is eliminated) in the final EWOD device assembly, reducing cost and complexity.

As a corresponding method of assembly for the embodiment of FIG. 16, the device structure is initially assembled into the structure shown for example in FIG. 3 with the spacer provided. In this manner, the spacer can set the substrate spacing to define the proper EWOD channel cell gap during assembly, but the spacer does not remain inside the assembled EWOD device as part of the device during usage. Rather, the spacer acts as a tool to aid assembly, and the spacer subsequently is removed after the fixing layers have been cured, after which the resultant EWOD device 80i is configured as depicted in FIG. 16. In this embodiment, the fixing layer material is selected and applied in a manner that ensures that the fixing material does not wick underneath the spacer during assembly, which could interfere with subsequent removal of the spacer after curing. This embodiment has an advantage in that a uniform cell gap is produced similarly as when a dry spacer is utilized without the need for retention of the spacer in the final device configuration.

FIG. 17 is a drawing depicting a side cross-section view of another exemplary EWOD device 80j in accordance with embodiments of the present invention. This embodiment provides another manner in which device configuration may be simplified and less costly by the elimination of a more conventional component. In the embodiment of FIG. 17, a housing 140 is formed having a portion 142 constituting an integral upper substrate assembly. In other words, in this embodiment the upper substrate 142 is not separate from the remainder of the plastic housing 140. Accordingly, as integral components, the upper substrate 142 includes plastic and at least in part is made of the same material as the overall housing 140. This embodiment has an advantage of reducing the number of parts and assembly steps in the production of the EWOD device, and therefore reduces the cost and complexity of the EWOD device.

Figure 18:
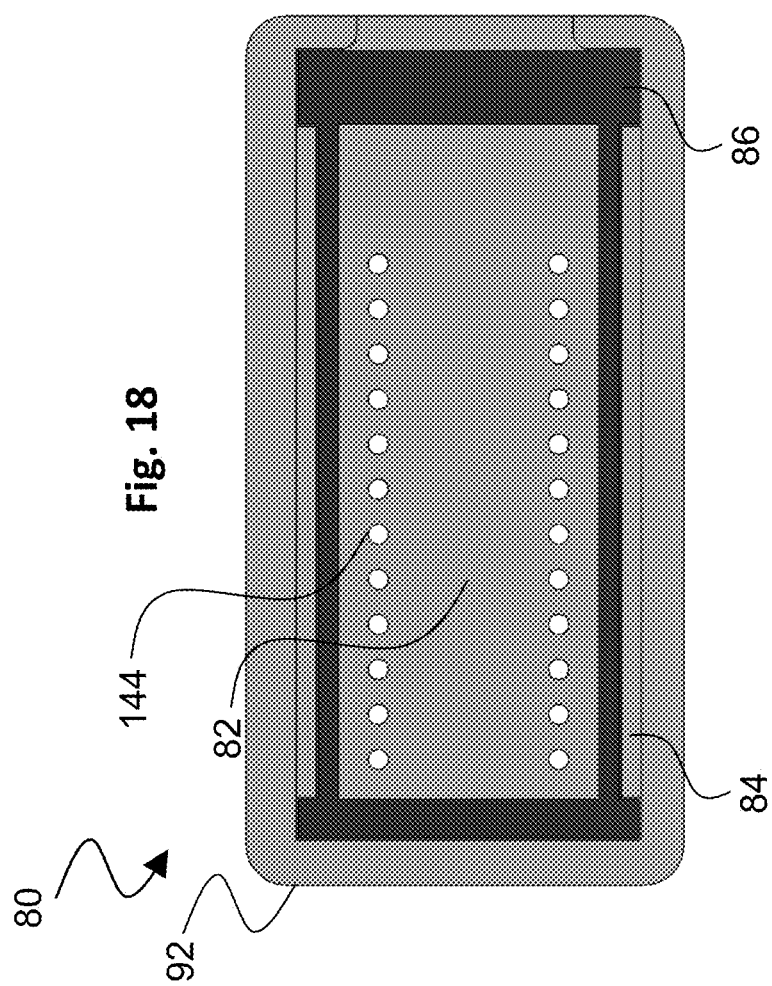
FIG. 18 is a drawing depicting a plan view of an exemplary EWOD device in accordance with embodiments of the present invention, including the addition of fluid input structures.

The descriptions of the various configurations of EWOD device 80-80j are non-specific as to any particular fluid input structures. FIG. 18 is a drawing depicting a plan view of the exemplary EWOD device 80 in accordance with embodiments of the present invention, including the addition of fluid input structures 144. In the example of FIG. 18, fluid input structures may be formed as apertures in the upper substrate 82, which may be drilled or otherwise cut into such substrate. The use of apertures 144 has an advantage of enabling the loading and extracting of fluids from the EWOD device without using a specialized spacer design. It will be appreciated, however, that any suitable configuration of input structures may be employed, including for example configuring the spacer to permit side loading of fluid into the EWOD channel without having to form or use apertures in the upper substrate.

An aspect of the invention, therefore, is an enhanced EWOD device having a housing with alignment features optimized for simplified assembly. In exemplary embodiments, the EWOD device includes: a first substrate assembly and a second substrate assembly, wherein the first and second substrate assemblies have opposing inner surfaces; and wherein one of the first or second substrate assemblies includes electrowetting electrodes, and the opposing inner surfaces of the first substrate assembly and the second substrate assembly are spaced apart to define a channel between the opposing inner surfaces of the first and second substrate assemblies; a housing for receiving the first substrate assembly and the second substrate assembly, the housing comprising an alignment feature for locating at least one of the first and second substrate assemblies within the housing; and a fixing feature for fixing the first and second substrate assemblies within the housing. The second substrate assembly is located within the housing such that the second substrate assembly is an outer component of the EWOD device. The EWOD device may include one or more of the following features, either individually or in combination.

In an exemplary embodiment of the EWOD device, the alignment feature comprises a stepped configuration including a first substrate alignment surface for locating the first substrate assembly within the housing, and a second substrate alignment surface for locating the second substrate assembly within the housing.

In an exemplary embodiment of the EWOD device, the fixing feature comprises a first fixing layer of a fixing material that fixes the first substrate assembly to the housing at the first substrate alignment surface.

In an exemplary embodiment of the EWOD device, the fixing feature comprises a second fixing layer of a fixing material that fixes the second substrate assembly to the housing at the second substrate alignment surface.

In an exemplary embodiment of the EWOD device, the fixing material is a curable adhesive or curable glue.

In an exemplary embodiment of the EWOD device, the fixing material has a viscosity sufficiently high to form beads of fixing material.

In an exemplary embodiment of the EWOD device, the EWOD device further includes a spacer portion that spaces apart the opposing inner surfaces of the first substrate assembly from the second substrate assembly to define the channel between the first and second substrate assemblies; wherein the spacer portion is located between the first and substrate assemblies out of direct contact with the housing along at least a portion of the spacer.

In an exemplary embodiment of the EWOD device, the spacer portion comprises a photoresist layer that is deposited on one of the first substrate assembly or the second substrate assembly.

In an exemplary embodiment of the EWOD device, the EWOD device further includes a spacer that spaces apart the first substrate assembly from the second substrate assembly to define the channel between the first and second substrate assemblies. The alignment feature comprises a stepped configuration including a first substrate alignment surface for locating the first substrate assembly within the housing, and a spacer alignment surface for locating the spacer within the housing; and the fixing feature fixes the second substrate assembly to the housing indirectly by fixing the second substrate assembly to the spacer.

In an exemplary embodiment of the EWOD device, the fixing feature comprises a first fixing layer of fixing material that fixes the first substrate assembly to the housing at the first substrate alignment surface.

In an exemplary embodiment of the EWOD device, the fixing feature further comprises a second fixing layer of fixing material that fixes the spacer to the housing at the spacer alignment surface, and a third fixing layer of fixing material that fixes the second substrate assembly to the spacer.

In an exemplary embodiment of the EWOD device, the spacer has a double-sided tape configuration with adhesive layers being provided on opposing surfaces of a base spacer body to form the fixing feature.

In an exemplary embodiment of the EWOD device, portions of the housing are spaced apart from an edge of the second substrate assembly to form fixing ports for applying the fixing material.

In an exemplary embodiment of the EWOD device, a bottom outer surface of the housing extends beyond a bottom outer surface of the second substrate assembly.

In an exemplary embodiment of the EWOD device, the first substrate assembly is integral as part of the housing.

Another aspect of the invention is a simplified method of assembling the EWOD device using a housing with alignment features optimized for simplified assembly. In exemplary embodiments, the method of assembling includes the steps of: providing a housing for receiving a first substrate assembly and a second substrate assembly wherein the first and second substrate assemblies have opposing inner surfaces, the housing comprising an alignment feature for locating at least one of the first and second substrate assemblies within the housing; locating the first substrate assembly within the housing; locating the second substrate assembly within the housing, wherein at least one of the first and second substrate assemblies is located within the housing using the alignment feature; and applying a fixing material to form at least one fixing layer to fix the first and second substrate assemblies within the housing. One of the first or second substrate assemblies includes electrowetting electrodes, and the first substrate assembly and the opposing inner surfaces of the second substrate assembly are spaced apart to define a channel between the opposing inner surfaces of the first and second substrate assemblies. The second substrate assembly is located within the housing such that the second substrate assembly is an outer component of the EWOD device. The method of assembling may include one or more of the following features, either individually or in combination.

In an exemplary embodiment of the method of assembling, the method further includes locating a spacer within the housing, wherein the spacer spaces apart the first substrate assembly from the second substrate assembly to define the channel between the first and second substrate assemblies.

In an exemplary embodiment of the method of assembling, the second substrate assembly is located within the housing prior to applying the fixing material that fixes the second substrate assembly in place; after locating the first and second substrate assemblies within the housing, portions of the housing are located spaced apart from an edge of the second substrate assembly to form fixing ports for applying the fixing material; and the fixing material is applied through the fixing ports.

In an exemplary embodiment of the method of assembling, the method further includes locating a spacer within the housing; wherein the spacer spaces apart the first substrate assembly from the second substrate assembly to define the channel between the first and second substrate assemblies; and the spacer is located within the housing prior to applying the fixing material that fixes the spacer and/or second substrate assembly in place.

In an exemplary embodiment of the method of assembling, the method further includes fabricating a spacer portion from a photoresist layer deposited on the second substrate assembly prior to locating the second substrate assembly within the housing, wherein the spacer portion spaces apart the opposing inner surfaces of the first substrate assembly and the second substrate assembly define the channel.

In an exemplary embodiment of the method of assembling, the method includes: providing the housing; applying fixing material to form a first fixing layer at a first alignment surface defined by the housing; locating the first substrate assembly within the housing using the first alignment surface to fix the first substrate assembly to the housing via the first fixing layer; locating a spacer adjacent to the first substrate assembly; applying fixing material to form a second fixing layer at a second alignment surface defined by the housing; and locating the second substrate assembly within the housing using the second alignment surface to fix the second substrate assembly to either the housing or the spacer via the second fixing layer, wherein the spacer spaces apart the first substrate assembly from the second substrate assembly to define the channel between the first and second substrate assemblies.

In an exemplary embodiment of the method of assembling, the fixing material is a curable adhesive or curable glue, the method further including curing the EWOD device to set the fixing material.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The described embodiments could be used to provide an enhanced AM-EWOD device. The AM-EWOD device could form a part of a lab-on-a-chip system. Such devices could be used in manipulating, reacting and sensing chemical, biochemical or physiological materials. Applications include healthcare diagnostic testing, material testing, chemical or biochemical material synthesis, proteomics, tools for research in life sciences and forensic science.

REFERENCE SIGNS LIST

10—lower substrate
12—array element electrodes
12A—individual array element electrode
12B—individual array element electrode
14—liquid droplet
16—top substrate
18—spacer
20—nonpolar surround fluid
22—insulator layer
24—first hydrophobic coating
26—contact angle
28—second hydrophobic coating
30—reference electrode 36—exemplary AM-EWOD device
44—lower substrate
46—thin film electronics
48—array element electrodes
50—element array
52—liquid droplet
54—upper substrate
56—spacer
80/80a-j—EWOD device
82—upper substrate assembly
84—lower substrate assembly
86—spacer/spacer portion
88—EWOD channel
90—regions of spacer
92—housing
94—first fixing layer
96—second fixing layer
100—first substrate alignment surface
102—second substrate alignment surface
106—bottom outer surface
110—housing
112—first fixing layer
114—spacer
116—second fixing layer
118—third fixing layer
120—first substrate alignment surface
122—spacer alignment surface
124—portions of housing
125—fixing material
126—edge of bottom substrate
128—fixing ports
128a—first fixing ports
128b—second fixing ports
132—second fixing layer
134—bottom outer surface
140—housing
142—upper substrate
144—fluid input structures

What is claimed is:

1. An electrowetting on dielectric (EWOD) device comprising:
   a first substrate assembly and a second substrate assembly, wherein the first and second substrate assemblies have opposing inner surfaces;
   wherein one of the first or second substrate assemblies includes electrowetting electrodes, and the opposing inner surfaces of the first substrate assembly and the second substrate assembly are spaced apart to define a channel between the opposing inner surfaces of the first and second substrate assemblies;
   a housing for receiving the first substrate assembly and the second substrate assembly, the housing comprising an alignment feature for locating at least one of the first and second substrate assemblies within the housing; and
   a fixing feature for fixing the first and second substrate assemblies within the housing;
   wherein the second substrate assembly is located within the housing such that the second substrate assembly is an outer component of the EWOD device;
   wherein the alignment feature comprises a first substrate alignment surface that locates the first substrate assembly within the housing, and a second substrate alignment surface that locates the second substrate assembly within the housing;
   wherein the fixing feature comprises an adherence feature located directly against at least one of the first alignment surface and the second alignment surface that respectively fixes at least one of the first substrate assembly and the second substrate assembly in place;
   wherein the adherence feature comprises a first fixing layer of fixing material that fixes the first substrate assembly to the housing at the first substrate alignment surface; and wherein the adherence feature further comprises a second fixing layer of fixing material that is applied in a fixing plane where the second substrate alignment surface is located to fix the second substrate assembly to the housing at the second substrate alignment surface to set the channel cell gap between the first substrate assembly and the second substrate assembly; and
   wherein at least one of the first fixing layer of fixing material and the second fixing layer of fixing material fills non-uniformities in the housing.

2. The EWOD device of claim 1, wherein the alignment feature comprises a stepped configuration on an underside of the housing including a first step that has the first substrate alignment surface and a second step relative to the first step that has the second substrate alignment surface.

3. The EWOD device of claim 1, wherein the fixing material is a curable adhesive or curable glue.

4. The EWOD device of claim 3, wherein the fixing material has a viscosity sufficiently high to form beads of fixing material.

5. The EWOD device of claim 1, further comprising a spacer portion that spaces apart the opposing inner surfaces of the first substrate assembly from the second substrate assembly to define the channel between the first and second substrate assemblies;
   wherein the spacer portion is located between the first and second substrate assemblies out of direct contact with the housing along at least a portion of the spacer portion.

6. The EWOD device of claim 5, wherein the spacer portion comprises a photoresist layer that is deposited on one of the first substrate assembly or the second substrate assembly.

7. The EWOD device of claim 1, wherein portions of the housing are spaced apart from an edge of the second substrate assembly to form fixing ports for applying the fixing material.

8. The EWOD device of claim 1, wherein a bottom outer surface of the housing extends beyond a bottom outer surface of the second substrate assembly.

9. The EWOD device of claim 1, wherein the first substrate assembly is integral as part of the housing.

10. An electrowetting on dielectric (EWOD) device comprising:
    a first substrate assembly and a second substrate assembly, wherein the first and second substrate assemblies have opposing inner surfaces;
    wherein one of the first or second substrate assemblies includes electrowetting electrodes, and the opposing inner surfaces of the first substrate assembly and the second substrate assembly are spaced apart to define a channel between the opposing inner surfaces of the first and second substrate assemblies;
    a housing for receiving the first substrate assembly and the second substrate assembly, the housing comprising an alignment feature for locating at least one of the first and second substrate assemblies within the housing; and
    a fixing feature for fixing the first and second substrate assemblies within the housing;

wherein the second substrate assembly is located within the housing such that the second substrate assembly is an outer component of the EWOD device;
wherein the alignment feature comprises a first substrate alignment surface that locates the first substrate assembly within the housing, and a second substrate alignment surface that locates the second substrate assembly within the housing;
wherein the fixing feature comprises an adherence feature located directly against at least one of the first alignment surface and the second alignment surface that respectively fixes at least one of the first substrate assembly and the second substrate assembly in place;
the EWOD device further comprising a spacer that spaces apart the first substrate assembly from the second substrate assembly to define the channel cell gap between the first and second substrate assemblies;
wherein:
the alignment feature comprises a stepped configuration and further includes a spacer alignment surface that locates the spacer within the housing; and
the adherence feature includes fixing material that fixes the spacer to the housing at the spacer alignment surface and fixes the second substrate assembly to the spacer, whereby the adherence feature fixes the second substrate assembly to the housing indirectly by fixing the second substrate assembly to the spacer.

11. The EWOD device of claim 10, wherein the fixing feature comprises a first fixing layer of fixing material that fixes the first substrate assembly to the housing at the first substrate alignment surface, and the first fixing layer of fixing material fills non-uniformities in the housing.

12. The EWOD device of claim 11, wherein the adherence feature that fixes the spacer comprises a second fixing layer of fixing material that fixes the spacer to the housing at the spacer alignment surface, and a third fixing layer of fixing material that fixes the second substrate assembly to the spacer, and the second fixing layer of fixing material fills non-uniformities in the housing.

13. The EWOD device of claim 10, wherein the spacer has a double-sided tape configuration with adhesive layers being provided on opposing surfaces of a base spacer body to form the fixing feature.

14. A method of assembling an electrowetting on dielectric (EWOD) device comprising the steps of:
providing a housing for receiving a first substrate assembly and a second substrate assembly wherein the first and second substrate assemblies have opposing inner surfaces, the housing comprising an alignment feature for locating at least one of the first and second substrate assemblies within the housing;
locating the first substrate assembly within the housing;
locating the second substrate assembly within the housing, wherein at least one of the first and second substrate assemblies is located within the housing using the alignment feature; and
applying a first fixing layer of fixing material that fixes the first substrate assembly to the housing directly against a first substrate alignment surface, applying a second fixing layer of fixing material that is applied in a fixing plane to fix the second substrate assembly to the housing directly against a second substrate alignment surface to set the channel cell gap between the first substrate assembly and the second substrate assembly;
wherein at least one of the first fixing layer of fixing material and the second fixing layer of a fixing material fills non-uniformities in the housing;
wherein one of the first or second substrate assemblies includes electrowetting electrodes, and the opposing inner surfaces of the first substrate assembly and the second substrate assembly are spaced apart to define a channel between the opposing inner surfaces of the first and second substrate assemblies; and
wherein the second substrate assembly is located within the housing such that the second substrate assembly is an outer component of the EWOD device.

15. The method of assembling of claim 14, further comprising locating a spacer within the housing, wherein the spacer spaces apart the first substrate assembly from the second substrate assembly to define the channel between the first and second substrate assemblies.

16. The method of assembling of claim 14, wherein:
the second substrate assembly is located within the housing prior to applying the fixing material that fixes the second substrate assembly in place;
after locating the first and second substrate assemblies within the housing, portions of the housing are located spaced apart from an edge of the second substrate assembly to form fixing ports for applying the fixing material; and
the fixing material is applied through the fixing ports.

17. The method of assembling of claim 16, further comprising locating a spacer within the housing;
wherein the spacer spaces apart the first substrate assembly from the second substrate assembly to define the channel between the first and second substrate assemblies; and
the spacer is located within the housing prior to applying the fixing material that fixes the spacer and/or second substrate assembly in place.

18. The method of assembling of claim 14, further comprising fabricating a spacer portion from a photoresist layer deposited on the second substrate assembly prior to locating the second substrate assembly within the housing, wherein the spacer portion spaces apart the opposing inner surfaces of the first substrate assembly and the second substrate assembly define the channel.

19. The method of assembling of claim 14, comprising:
providing the housing;
applying fixing material to form the first fixing layer at the first alignment surface defined by the housing;
locating the first substrate assembly within the housing using the first alignment surface to fix the first substrate assembly to the housing via the first fixing layer;
locating a spacer adjacent to the first substrate assembly;
applying fixing material to form the second fixing layer at the second alignment surface defined by the housing; and
locating the second substrate assembly within the housing using the second alignment surface to fix the second substrate assembly to either the housing or the spacer via the second fixing layer, wherein the spacer spaces apart the first substrate assembly from the second substrate assembly to define the channel between the first and second substrate assemblies.

20. The assembling method of claim 14, wherein the fixing material is a curable adhesive or curable glue, the method further comprising curing the EWOD device to set the fixing material.

* * * * *